Oct. 9, 1928.
A. W. HALLBERG
LAVATORY FIXTURE
Filed July 8, 1925
1,687,019
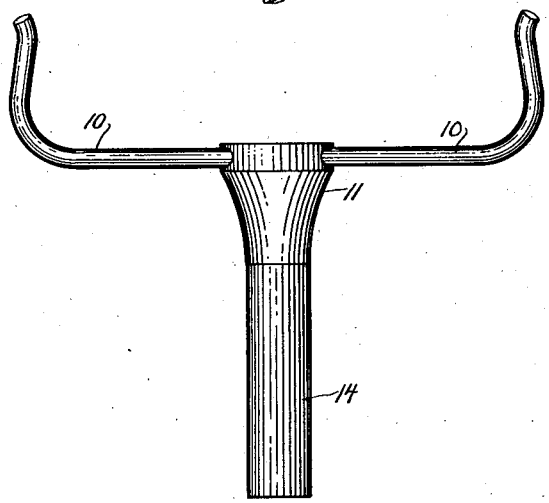
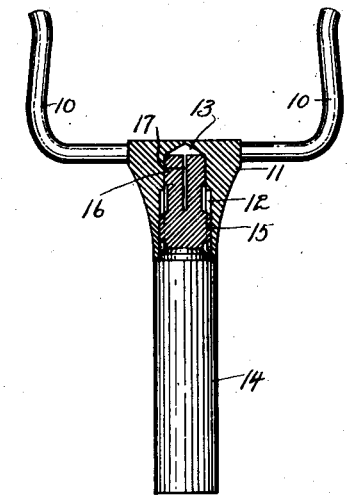
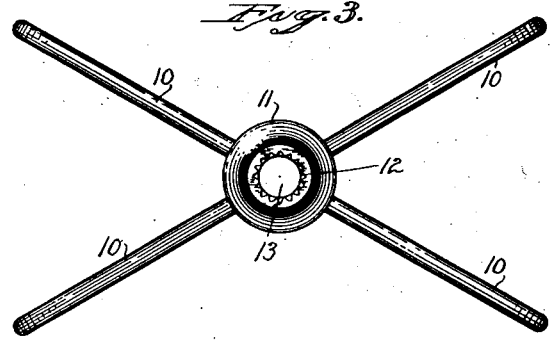
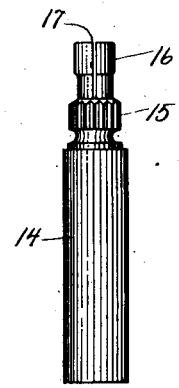
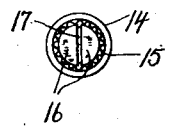

Patented Oct. 9, 1928.

1,687,019

UNITED STATES PATENT OFFICE.

AUGUST W. HALLBERG, OF WATERBURY, CONNECTICUT, ASSIGNOR TO CHASE COMPANIES, INC., OF WATERBURY, CONNECTICUT, A CORPORATION.

LAVATORY FIXTURE.

Application filed July 8, 1925. Serial No. 42,156.

Fig. 1 is a side view of a lavatory fixture constructed in accordance with my invention.

Fig. 2 a vertical sectional view.

Fig. 3 an underside view of the socket-member detached.

Fig. 4 a side view of the post-member detached.

Fig. 5 a plan view of the post-member.

This invention relates to improvement in lavatory fixtures, and particularly to holders for soap dishes, tumblers, and similar devices. In holders of this type, and particularly for soap holders, it is desirable that the holder should stand in a certain position, and the object of this invention is to provide means for adjusting the holder proper with relation to its post, that it may be turned to the desired position, and firmly held in place, and the invention consists in forming the post with a frictional head adapted to enter and interlock with the socket supporting the holder, and the invention also consists in the construction as hereinafter described and particularly recited in the claim.

The holder may be of any desired form and design, here represented as four outwardly and upwardly extending arms 10 mounted in a socket 11 which is formed with a circular, vertically-serrated chamber 12, beyond which is a contracted recess 13. The post or support 14 is formed with a serrated neck 15 and with a head 16, the head being vertically divided by a slot 17 and normally expanded so as to be slightly larger than the recess. The socket is turned to the desired position and set over the upper end of the post, the teeth in the post engaging with the teeth in the socket, so as to prevent the socket from being rotated. As the socket is forced down, the head 16 enters the recess 13, with which it frictionally engages, so as to prevent the socket from being accidentally lifted off from the post. By spreading the head 16, the necessary amount of friction between the post and the socket may be attained. The external form of the socket may be of any approved design, but its lower end merges with the post, so that, when set in place, it appears to form an integral structure.

I claim:

In a lavatory fixture, the combination with a post-member, of a socket-member applied to the upper end thereof, a holder carried by and overhanging the latter, the said post-member being formed at its upper end with a bifurcated stem encircled by teeth parallel with the axis of the said post-member, and a chamber in said socket-member shaped to correspond to the upper end portion of said post-member, whereby said bifurcated portion is received, compressed, and maintained under compression in said chamber and provided with a complementary series of teeth parallel with its axis for engagement with the teeth of the post-member, whereby the said post-member and socket-member may be joined in a plurality of relative, rotary positions in any one of which they will be positively held against relative rotation by the said teeth and in which they will be frictionally held against being drawn apart by the co-action of the bifurcated stem with walls of the said chamber.

In testimony whereof, I have signed this specification.

AUGUST W. HALLBERG.